United States Patent [19]

Diamond

[11] 3,890,553

[45] June 17, 1975

[54] DIRECT COUPLED AMPLIFIER IN NULL BALANCE CIRCUIT OR THE LIKE

[75] Inventor: Allen M. Diamond, Orange, Calif.

[73] Assignee: Beckman Instruments, Inc., Fullerton, Calif.

[22] Filed: Oct. 23, 1973

[21] Appl. No.: 408,993

[52] U.S. Cl. .................... 318/678; 318/684; 330/69
[51] Int. Cl. .............................................. G05b 5/01
[58] Field of Search ...... 318/678, 684, 615; 330/69, 330/116

[56] References Cited

UNITED STATES PATENTS

| | | | |
|---|---|---|---|
| 3,183,420 | 5/1965 | Westenskow | 318/678 X |
| 3,239,733 | 3/1966 | Sikorra | 318/678 X |
| 3,454,850 | 7/1969 | Miller | 318/684 |
| 3,697,871 | 10/1972 | MacMullan | 318/678 X |
| 3,721,883 | 3/1973 | Whitmore et al. | 318/615 |

*Primary Examiner*—B. Dobeck
*Attorney, Agent, or Firm*—Robert J. Steinmeyer; Robert R. Meads

[57] ABSTRACT

In a null balance circuit such as might be employed in conjunction with a moving pen chart recorder connected to an instrument such as a spectrophotometer, recovery time when using a null balance circuit for a null other than zero volts is speeded by eliminating alternating-current coupled circuits which require resistance-capacity time constants. The motor for driving a reference-voltage supplying potentiometer is connected through a power amplifier which is connected to a differential amplifier that is direct coupled to a chopper to eliminate time constants. The differential amplifier has a first input terminal which is switched back and forth between the signal input terminal and the reference terminal by the chopper and a second input terminal which is supplied with a voltage which is the average of the signal input and reference voltages so that the effective input to the differential amplifier is symmetrical with respect to the average of the signal input and reference voltages.

14 Claims, 3 Drawing Figures

DIRECT COUPLED AMPLIFIER IN NULL BALANCE CIRCUIT OR THE LIKE

BACKGROUND OF THE INVENTION

Null balance circuits have been employed in which a chopper switches between a signal input terminal and a reference terminal. The difference between the voltages at the signal input and reference terminals is presented to an amplifier as a square wave, which is further amplified by a power amplifier to drive a motor which drives a follow-up potentiometer to supply a reference voltage back to the chopper. When the reference voltage is equal to the signal input voltage, the chopper has no output and the system is at null.

It has been the practice to provide alternating-current coupling between the output of the chopper and the amplifier. This has necessitated providing a long time constant, typically ten times or more, to preserve the integrity of the square wave. However, in a high speed system the time constant of the coupling network causes a direct-current offset to appear in the input to the amplifier. This offset blocks the amplifier until the time constant has discharged, which appreciably slows the response.

An object of the invention is to overcome the problems of long time constant, direct-current offset and blockage of the amplifier.

Other and further objects, features and advantages of the invention will become apparent as the description proceeds.

SUMMARY OF THE INVENTION

In accordance with a preferred embodiment of the invention, recovery time of a null balance circuit for a chopper type signal comparator is speeded up by direct coupling of the chopper and the amplifier, and employing a differential amplifier with a first terminal directly connected to the chopper and a second terminal fed with the average of the signal and reference voltages. This causes the effective input to the differential amplifier always to be symmetrical about a simulated ground. A voltage representing the average of the signal input and the reference voltage is obtained by connecting a pair of resistors in series between the signal input terminal and the reference voltage terminal, the series resistors having a junction terminal connected to the second input terminal of the differential amplifier.

A better understanding of the invention will be afforded by the following detailed description considered in conjunction with the accompanying drawings.

BRIEF DESCRIPTION OF THE DRAWINGS

Like reference characters are utilized throughout the drawing to designate like parts.

DETAILED DESCRIPTION

Figure 1:
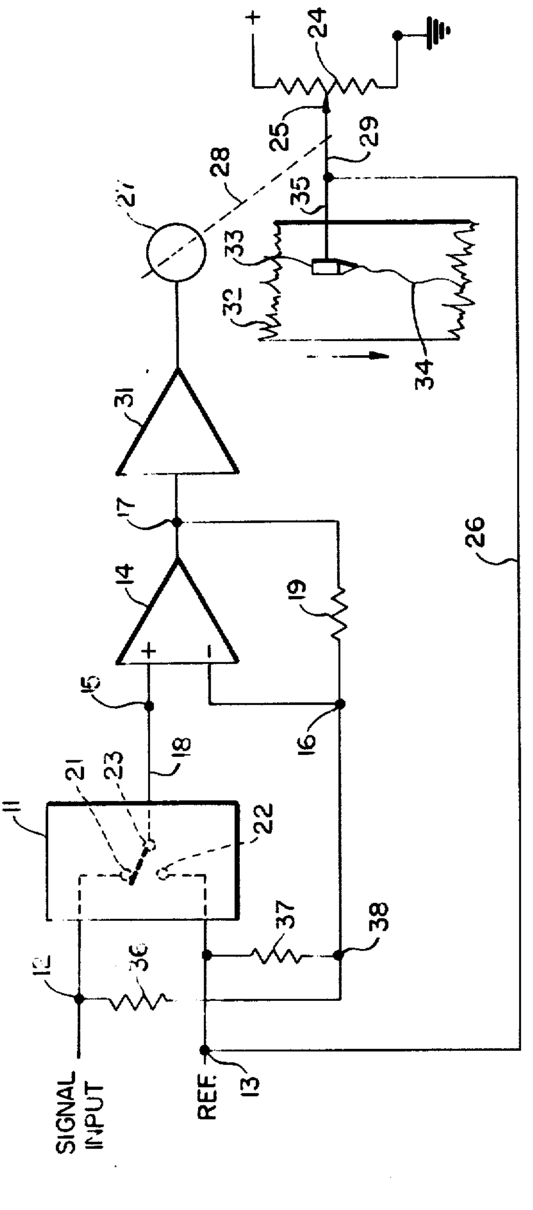
FIG. 1 is a schematic diagram of a null balance circuit in accordance with the invention.

As illustrated in FIG. 1, a chopper 11 is provided for producing a square wave (FIG. 3) from a signal input voltage and a reference voltage applied at a signal input terminal 12 and a reference terminal 13 respectively. A differential amplifier 14 is provided having a positive input terminal 15, a negative input terminal 16 and an output terminal 17. A conductor 18 is provided for making a direct connection between the chopper 11 and the input terminal 15 of the amplifier 14 to avoid the delay involved in an alternating current coupling between the chopper 11 and the amplifier 14.

For the sake of simplicity in explanation of operation, the chopper 11 is represented in FIG. 1 as a single-pole, double-throw switch having a pair of stationary contacts 21 and 22, connected to the signal input terminal 12 and the reference terminal 13, respectively, and a movable contact 23 connected to the conductor 18, and having means (not shown in FIG. 1) for switching the movable contact 23 and thus the connection of the conductor 18 back and forth between the terminals 12 and 13.

The differential amplifier 14 may be an operational amplifier with a resistance feedback connection 19 from the output terminal 17 to the negative input terminal 16 for setting the amplifier gain. In practice, the chopper 11 is preferably in the form of an electronic circuit.

An adjustable reference voltage source shown as a followup potentiometer is provided comprising a resistor 24 energized with direct current having a sliding contact 25 connected to the reference terminal 13 through a conductor 26. A servomotor 27 is provided which is energized in accordance with the voltage appearing at the output terminal 17 of the amplifier 14 to drive the sliding contact 25 in one direction or the other for correcting the reference voltage appearing at the reference terminal 13. There is suitable linkage represented schematically by a motor shaft 28 and a sliding contact arm 29 for enabling the servomotor 27 to adjust the position of the sliding contact 25. Preferably a power amplifier 31 is provided which is interposed between the differential amplifier output terminal 17 and the servomotor 27.

Assuming that the null balance circuit is employed in conjunction with a chart recorder which is to record the fluctuations in the signal applied at the terminal 12, the servomotor 27 may also be arranged to drive a chart pen. As indicated schematically in FIG. 1, there may be a moving strip chart 32 having a movable pen 33 in contact with the chart 32 to produce a curve 34 and the pen 33 is connected to the servomotor 27 through suitable linkage represented schematically by a pen arm 35 and the motor shaft 28. The servomotor 27 is reversible according to the polarity of the voltage applied thereto in response to the voltage appearing at the output terminal 17 of differential amplifier 14.

Resistors 36 and 37, preferably of equal resistance, are connected in series between the signal input terminal 12 and the reference terminal 13, and have a junction terminal 38 which is connected to the negative input terminal 16 of the differential amplifier 14 in order to apply a voltage to the terminal 16 which is the average of the signal input and the reference voltage.

OPERATION

Figure 3:
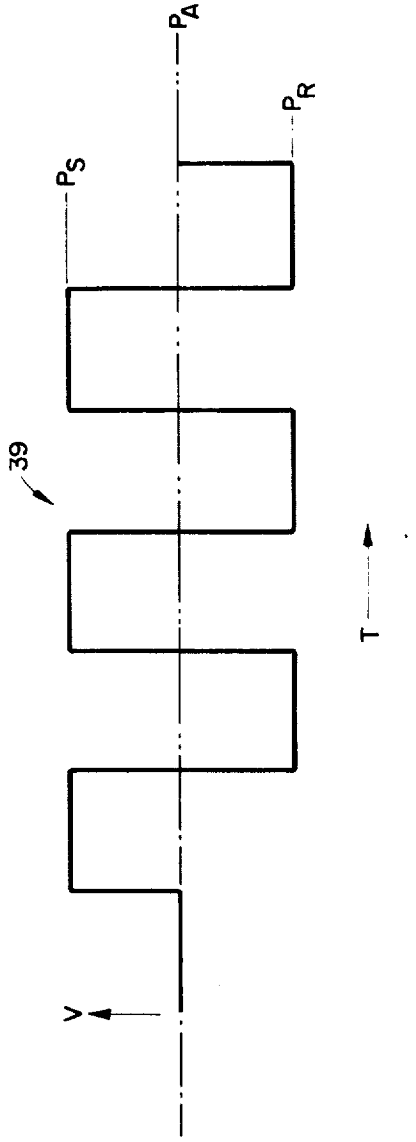
FIG. 3 is a graphical representation of a voltage waveform derived in the operation of the null balance circuit.

If a starting condition is assumed with both the reference voltage and the signal input voltage equal to zero, there is no output from the chopper 11 and no action takes place. Then if a positive signal is placed upon the signal input terminal 12, the negative terminal 16 of the differential amplifier 14 connected to junction terminal 38 will be at a potential representing the average of the potentials at the terminals 12 and 13 due to the voltage division across the equal resistors 36 and 37. As illustrated in FIG. 3, the chopper 11 will produce an output square wave 39 with one half at the potential $P_R$ of the terminal 13 and the other half at the potential $P_S$ at the terminal 12. The square wave 39 is symmetrical with respect to the potential $P_A$ appearing at the junction terminal 38 of the voltage averaging resistor pair 36, 37. The square wave 39 is amplified, causing the servomotor 27 to drive the follow-up potentiometer contact 25 upward which causes the potential $P_R$ at the terminal 13 to rise, reducing the amplitude of the square wave 39 until it falls to zero at which time the servomotor 27 stops.

This comes about because as the reference voltage $P_R$ increases, approaching the signal voltage $P_S$, the average of them is applied to the negative terminal 16 of the differential amplifier 14, maintaining a potential halfway between the potentials at the terminals 12 and 13. As there are no coupling capacitors in the circuit, no time constants were involved in the setting time of the electronic circuitry.

ELECTRONIC CIRCUITRY

Figure 2:
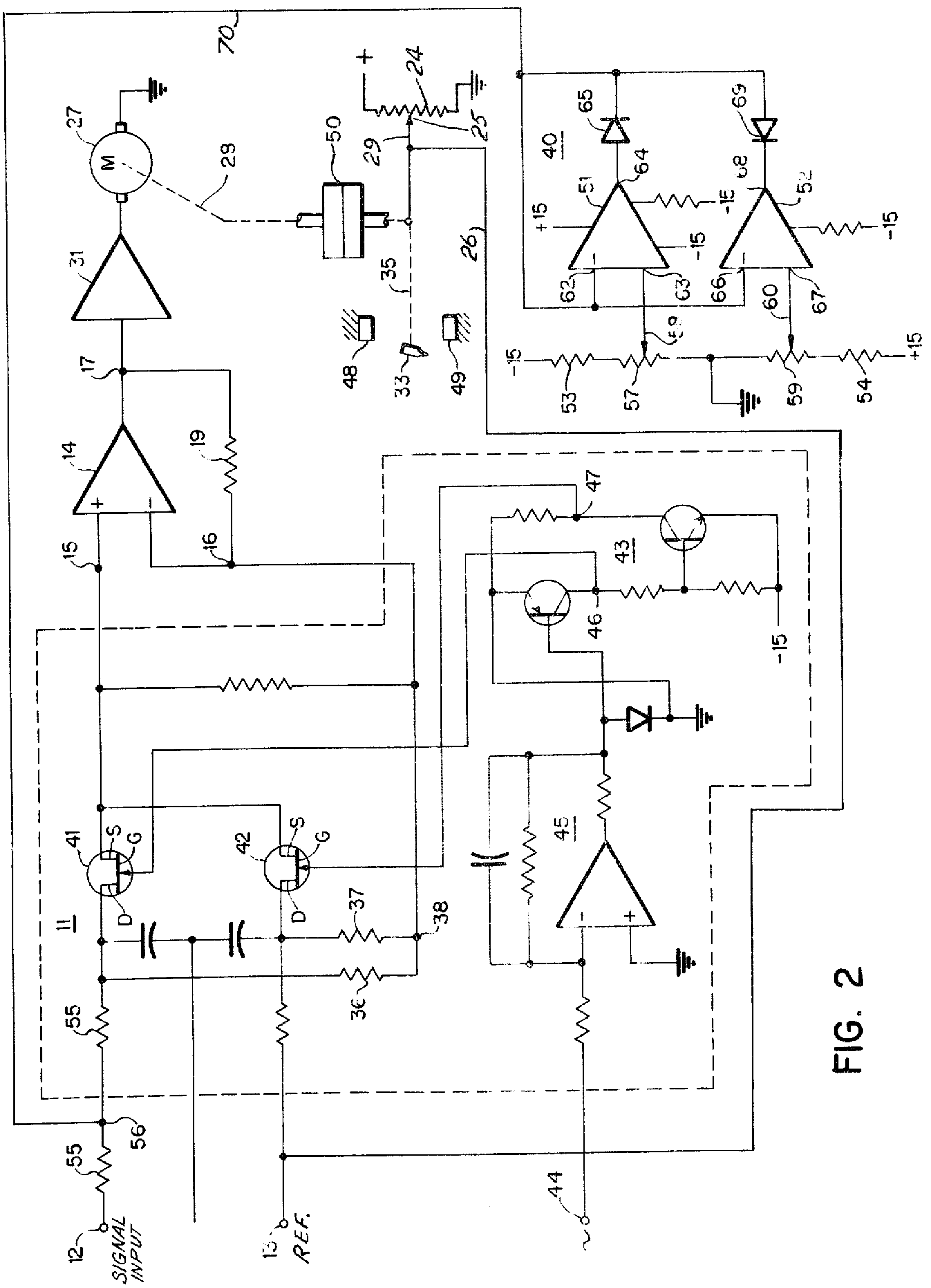
FIG. 2 is a detailed circuit diagram of the null balance circuit of FIG. 1.

As illustrated in FIG. 2, the chopper 11 may comprise a pair of field-effect transistors 41 and 42 controlled by a suitable pulsing circuit such as a two-phase PNP-NPN transistor switching circuit 43 triggered at a uniform rate by an alternating voltage such as central station power supply applied at a terminal 44, preferably through a phase shifting integrator 45. Each of the field-effect transistors 41 and 42 comprises a drain D, a source S and a gate G. The gates G are connected to output terminals 46 and 47 of opposite polarity of the circuit 43. The drains D of the field-effect transistors 41 and 42 are connected to the signal input terminal 12 and the reference terminal 13, respectively, and the sources S are both connected to the positive input terminal 15 of the differential amplifier 14.

As the gates G of the field-effect transistors 41 and 42 alternately are energized, the transistors 41 and 42 conduct alternately so as to connect the terminals 12 and 13 alternately to the input terminal 15 of the differential amplifier 14. In this manner the square wave 39 of FIG. 3 is produced.

Moving-strip, chart recorders may be provided with limit stops such as the stops 48 and 49, represented schematically in FIG. 2, to prevent the pen arm 35 from moving off scale or beyond the edges of the strip chart 32 and tearing the chart upon return in the event of very large fluctuations in the value of the signal applied at the signal input terminal 12. With such recorders, a slip clutch 50 may be provided in the linkage between the motor shaft 28 and the pen arm 35. In many cases such slip clutches produce noise or chatter and it is desirable to avoid such effects.

Accordingly, in the arrangement illustrated in FIG. 2, an input voltage limiter 40 is provided. In the embodiment illustrated the input limiter 40 takes the form of a pair of differential amplifiers 51 and 52 in conjunction with a negative voltage supply 53, a positive voltage supply 54 and an input resistor 55 having a center tap 56. The limit adjusting voltage supplies 53 and 54 comprise a potentiometer 57 connected to the negative voltage terminal with a sliding contact 58 and a potentiometer 59 connected to the positive terminal with a sliding contact 60. The input resistor 55 is connected in series between the signal input terminal 12 and the chopper transistor 41.

The differential amplifier 51 has a negative input terminal 62 connected to the input resistor center tap 56 through a conductor 70, a positive input terminal 63 connected to the negative potentiometer sliding contact 58 and an output terminal 64 with a feedback connection to the input terminal 62 through a diode 65 connected as shown with its positive electrode connected to the output terminal 64. Similarly, the differential amplifier 52 has a negative input terminal 66 connected to terminal 56 through conductor 70, a positive input terminal 67 connected to positive potentiometer sliding contact 60 and an output terminal 68 with a feedback connection to the negative input terminal 66. The feedback connection is through a diode 69 connected with a polarity opposite to the feedback connection of the diode 65.

In case an input signal at the terminal 12 should reach a value which would cause the pen arm 35 to approach either of the limit stops 48 or 49, the input to the terminal 62 of the differential amplifier 51 or to the terminal 66 of the differential amplifier 52 would exceed the potential at the potentiometer contact 58 or 60, depending upon the polarity of the signal input, causing one or the other of the differential amplifiers 51 or 52 to conduct through the diode 65 or 69, shunting out the mid terminal 56 of the input series resistor 55 and preventing the signal at the chopper transistor 41 from exceeding the value for which the potentiometer sliding contact 58 or 60 is set.

A specific circuit arrangement has been illustrated and described by way of example but it will be understood that the invention is not limited to the embodiment illustrated and various modifications will suggest themselves to those skilled in the art without departing from the spirit of the invention.

What is claimed is:

1. A circuit for achievement of null balance comprising in combination with a signal input terminal and a reference terminal:

- switch means with an output terminal intermittently shifted between connection to the signal input terminal and the reference terminal,
- a voltage divider connected between the signal input terminal and the reference terminal,
- an average voltage terminal connected to an intermediate point on the voltage divider,
- a differential amplifier with first and second input terminals and an output terminal, the first being directly connected to the switch means output terminal and the second being connected to the average voltage terminal,
- an adjustable-voltage source of reference voltage with adjusting means, said source being connected to said reference terminal, and
- driving means responsive to output of said differential amplifier for driving said adjusting means.

2. A circuit as defined in claim 1 wherein the differential amplifier has a polarized output and the driving means is reversible in response to reverse polarity of the output of the differential amplifier.

3. A moving pen chart recorder employing the null balance circuit defined in claim 1 wherein the recorder has a moving pen operatively connected to said driving means.

4. The chart recorder defined in claim 3 wherein the moving pen has a limit stop and said driving means includes a slip clutch interposed in the connection to said moving pen, and an input limiter is connected to said input terminal.

5. The circuit as defined in claim 1 wherein the voltage divider comprises a pair of series-connected, equal resistances with the voltage terminal situated at the junction thereof, whereby the voltage level established at said voltage terminal and supplied to the second input terminal of the differential amplifier is the average of the voltages at the signal input terminal and the reference terminal.

6. A moving pen chart recorder comprising in combination with a signal input terminal and a reference terminal:

- a chopper with an output terminal intermittently shifted between connection to the signal input terminal and the reference terminal,
- an average voltage terminal and means for supplying thereto a potential intermediate that between the signal input terminal and the reference terminal,
- a differential amplifier with first and second input terminals and an output terminal, the first being directly connected to the chopper output terminal and the second being connected to the average voltage terminal,
- an adjustable-voltage source of reference voltage with adjusting means, said source being connected to said reference voltage terminal,
- driving means responsive to output of said differential amplifier for driving said adjusting means to achieve a null balance,
- a moving pen operatively connected to said driving means, said moving pen having a limit stop and said driving means including a slip clutch interposed in the connection to said moving pen,
- an impedance having an intermediate terminal, said impedance being connected in series between the signal input terminal and the chopper, and
- an input limiter connected in shunt to said intermediate terminal.

7. The chart recorder defined in claim 6 wherein the input limiter comprises means for supplying positive and negative voltages corresponding to the chart pen positions for the limit stops, a pair of differential amplifiers each having an output terminal, a first input terminal connected to said intermediate terminal and a second input terminal, one of the second input terminals being connected to the positive voltage supply means and the other being connected to the negative voltage supply means, and a pair of rectifiers connected in series between said differential amplifier output terminals with a common terminal connected to said intermediate terminal.

8. The chart recorder defined in claim 7 wherein the chopper comprises a pair of field effect transistors, each having a drain, a gate and a source, and a triggered switching circuit with opposite polarity output terminals each connected to the first input terminal of the differential amplifier, one drain being operatively connected to the signal input terminal and the other drain being operatively connected to the reference terminal.

9. A circuit for achievement of null balance comprising in combination with a signal input terminal and a reference terminal:

- a pair of field-effect transistors, each having a drain, a gate and a source,
- a triggered switching circuit with opposite polarity output terminals each connected to a different one of said gates,
- an average voltage terminal and means for supplying thereto a potential intermediate that between the signal input terminal and the reference terminal,
- a differential amplifier with first and second input terminals and an output terminal,
- adjustable voltage source of reference voltage with adjusting means, said source being connected to said reference terminal,
- driving means responsive to the output of said differential amplifier for driving said adjusting means, and
- the field effect transistor sources being directly connected to the first input terminal of the differential amplifier, one drain being operatively connected to the signal input terminal and the other drain being operatively connected to the reference terminal, the second differential amplifier input terminal being connected to the average voltage terminal.

10. In a null balance circuit employing a signal input terminal receiving a signal input voltage, a reference terminal receiving a reference voltage from a motor driven follow-up potentiometer, a chopper which switches between the signal input and reference terminals to produce a chopper output signal, the improvement which comprises:

- a differential amplifier with a first input terminal directly connected to the chopper to receive the chopper output signal, a second input terminal, and an output terminal to which the motor is operatively connected, and
- means for supplying the average of the signal input voltage and the reference voltage to the second input terminal of the differential amplifier whereby the differential amplifier compares the chopper output signal supplied to the first input terminal with the average value of the signal input voltage and the reference voltage, and the motor adjusts the value of the reference voltage until the output of the differential amplifier falls to zero and the motor stops.

11. A circuit comprising the combination of:

- a signal input terminal for receiving a signal input voltage;
- a reference terminal for receiving a reference voltage;
- switch means with an output terminal alternately connected to the signal input terminal and the reference terminal;
- a differential amplifier with first and second input terminals and an output terminal;
- means for directly connecting the output terminal of said switch means to the first input terminal of said differential amplifier;
- a voltage terminal;
- means for deriving a potential at the voltage terminal which is intermediate and a function of the signal input voltage and the reference voltage; and
- means for connecting the voltage terminal to the second input terminal of said differential amplifier.

12. The circuit of claim 11 wherein said means for deriving includes a voltage divider connected to the signal input terminal and the reference terminal for deriving said potential as the average value of the signal input voltage and the reference voltage.

13. The circuit of claim 11 wherein said means for deriving includes first and second equal resistances connected in series between the signal input terminal and the reference terminal, said voltage terminal being situated at the common point between said first and second resistances.

14. The circuit of claim 11 further including means connected between the output terminal of said differential amplifier and the reference terminal for adjusting the value of said reference voltage to achieve null balance of the circuit.

* * * * *